United States Patent
Miller et al.

(10) Patent No.: US 7,616,372 B2
(45) Date of Patent: Nov. 10, 2009

(54) PIANO MEMS WITH HIDDEN HINGE

(75) Inventors: John Michael Miller, Gatineau (CA); Barrie Keyworth, Stittsville (CA)

(73) Assignee: JDS Uniphase Corporation, Milpitas, CA (US)

(*) Notice: Subject to any disclaimer, the term of this patent is extended or adjusted under 35 U.S.C. 154(b) by 166 days.

(21) Appl. No.: 11/696,335

(22) Filed: Apr. 4, 2007

(65) Prior Publication Data

US 2007/0236775 A1    Oct. 11, 2007

Related U.S. Application Data

(60) Provisional application No. 60/789,564, filed on Apr. 6, 2006.

(51) Int. Cl.
*G02B 26/00* (2006.01)
*H02N 1/00* (2006.01)

(52) U.S. Cl. .............. 359/291; 359/290; 359/292; 310/309

(58) Field of Classification Search .......... 359/290, 359/291, 292, 293, 295, 298, 220, 222, 223, 359/224, 320, 324, 212, 225; 310/22, 36, 310/90, 309, 328; 438/29, 52, 72, 401, 406, 438/455; 216/2, 36; 257/415

See application file for complete search history.

(56) References Cited

U.S. PATENT DOCUMENTS

| | | | |
|---|---|---|---|
| 6,028,689 A * | 2/2000 | Michalicek et al. | 359/224 |
| 6,327,855 B1 | 12/2001 | Hill et al. | 60/528 |
| 6,454,421 B2 | 9/2002 | Yu et al. | 359/872 |
| 6,491,404 B2 | 12/2002 | Hill | 359/872 |
| 6,529,652 B1 | 3/2003 | Brener | 385/16 |
| 6,533,947 B2 | 3/2003 | Nasiri et al. | 216/2 |
| 6,535,319 B2 | 3/2003 | Buzzetta et al. | 359/225 |
| 6,677,695 B2 | 1/2004 | Dhuler et al. | 310/309 |
| 6,856,437 B2 * | 2/2005 | Witt et al. | 359/200.7 |
| 6,912,078 B2 * | 6/2005 | Kudrle et al. | 359/224 |
| 6,968,101 B2 | 11/2005 | Miller et al. | 385/18 |
| 7,010,188 B2 | 3/2006 | Miller et al. | 385/18 |
| 2002/0126455 A1 | 9/2002 | Wood | 361/728 |

* cited by examiner

*Primary Examiner*—Hung X Dang
*Assistant Examiner*—Tuyen Q Tra
(74) *Attorney, Agent, or Firm*—Teitelbaum & MacLean; Neil Teitelbaum; Doug MacLean

(57) ABSTRACT

The micro-electro-mechanical mirror device according to the present invention includes a platform pivotable about two perpendicular axes, and a hinge structure disposed beneath the platform. The hinge structure includes first and second hinges and a gimbal ring fabricated in a single layer beneath the platform layer. One end of the hinge structure extends from the undersurface of the platform, while the other end extends from a pedestal, which extends upwardly from a substrate.

18 Claims, 14 Drawing Sheets

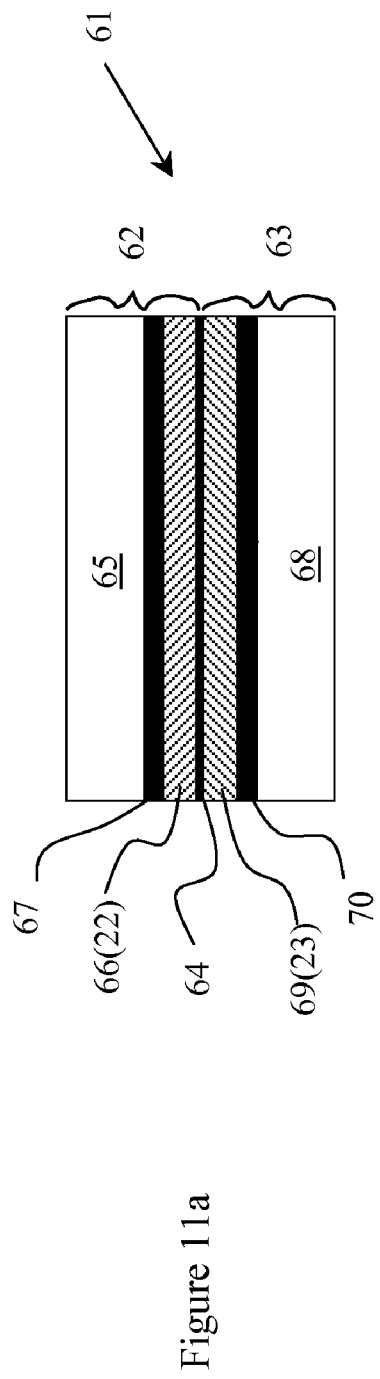
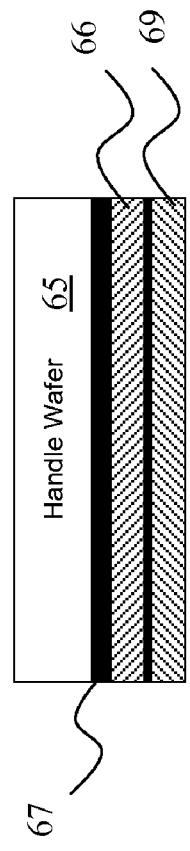
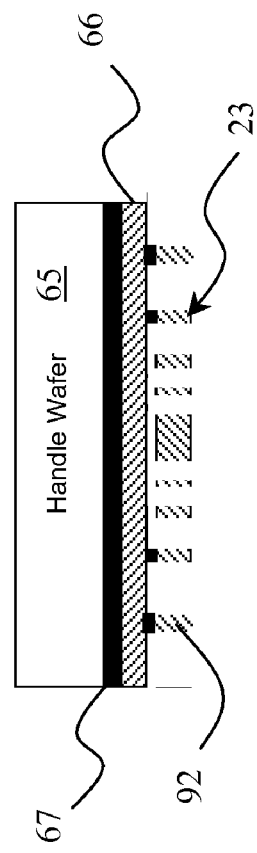
Figure 11a
Figure 11b
Figure 11c

PIANO MEMS WITH HIDDEN HINGE

CROSS-REFERENCE TO RELATED APPLICATIONS

The present invention claims priority from U.S. Patent Application No. 60/789,564 filed Apr. 6, 2006, which is incorporated herein by reference for all purposes.

TECHNICAL FIELD

The present invention relates to a pivoting micro-electro-mechanical (MEMs) mirror, and in particular to a pivoting MEMs mirror in which the hinge is positioned underneath the reflective platform.

BACKGROUND OF THE INVENTION

Conventional MEMs mirrors for use in optical switches, such as the one disclosed in U.S. Pat. No. 6,535,319 issued Mar. 18, 2003 to Buzzetta et al, redirect beams of light to one of a plurality of output ports, and include an electro-statically controlled mirror pivotable about a single axis. Tilting MEMs mirrors, such as the ones disclosed in U.S. Pat. No. 6,491,404 issued Dec. 10, 2002 in the name of Edward Hill, and U.S. Pat. No. 6,677,695 issued Jan. 13, 2004 in the name of Dhuler et al, which are incorporated herein by reference, comprise a mirror pivotable about a central longitudinal axis. The MEMs mirror device 1, disclosed in the aforementioned Hill patent, is illustrated in FIG. 1, and includes a rectangular planar surface 2 pivotally mounted by torsional hinges 4 and 5 to anchor posts 7 and 8, respectively, above a substrate 9. The torsional hinges may take the form of serpentine hinges, which are disclosed in U.S. Pat. No. 6,327,855 issued Dec. 11, 2001 in the name of Hill et al, and in United States Patent Publication No. 2002/0126455 published Sep. 12, 2002 in the name of Robert Wood, which are incorporated herein by reference. In order to position conventional MEMs mirror devices in close proximity, i.e. with a high fill factor (fill factor=width/pitch), they must be positioned with their axes of rotation parallel to each other. Unfortunately, this mirror construction restraint greatly restricts other design choices that have to be made in building the overall switch.

When using a conventional MEMs arrangement, the mirror 1 positioned on the planar surface 2 can be rotated through positive and negative angles, e.g. ±2°, by attracting one side 10a or the other side 10b of the planar surface 2 towards the substrate 9. Unfortunately, when the device is switched between ports at the extremes of the devices rotational path, the intermediate ports receive light for fractions of a millisecond as the mirror 1 sweeps the optical beam past these ports, thereby causing undesirable optical transient or dynamic cross-talk.

One solution to the problem of dynamic cross-talk is to initially or simultaneously rotate the mirror about a second axis, thereby avoiding the intermediate ports. An example of a MEMs mirror device pivotable about two axes is illustrated in FIG. 2, and includes a mirror platform 11 pivotally mounted by a first pair of torsion springs 12 and 13 to an external gimbal ring 14, which is in turn pivotally mounted to a substrate 16 by a second pair of torsion springs 17 and 18. Examples of external gimbal devices are disclosed in U.S. Pat. No. 6,529,652 issued Mar. 4, 2003 to Brenner, and U.S. Pat. No. 6,454,421 issued Sep. 24, 2002 to Yu et al. Unfortunately, an external gimbal ring greatly limits the number of mirrors that can be arranged in a given area and the relative proximity thereof, i.e. the fill factor. Moreover, an external gimbal ring may cause unwanted reflections from light reflecting off the support structures, e.g. the torsion springs 12, 13 and the gimbal ring 14.

Another proposed solution to the problem, is disclosed in U.S. Pat. No. 6,533,947 issued Mar. 18, 2003 to Nasiri et al, which include hinges beneath the mirror platform. Unfortunately, these types of mirror devices include four separate pivoting levers requiring a great deal of space and costly multi-step fabrication processes. Consequently, the entire hinge structure can not be hidden beneath the mirror platform.

The solution to overcome the shortcomings of the prior art proposed by the inventors of the parent application listed above is to provide a high fill factor MEMs mirror device that can pivot about the same axis as an adjacent mirror. In a preferred embodiment the MEMs mirror device is relatively easy to fabricate, with an internal gimbal ring and applicable in high fill factor applications.

Typically in MEMs mirror devices the hinge and the reflective mirror are defined in the same semiconductor, e.g. Si, layer, whereby the minimum thickness requirement of the mirrors, currently 15 microns to prevent radius of curvature creep due to gold stress relaxation, dictates that the hinge width be <1.5 microns in order to achieve the desired spring constant. These hinge dimensions are at the limit of current DRIE processes both for feature resolution and wafer uniformity. By independently optimizing the mirror and hinge thicknesses, the required hinge width can be increased to within comfortable manufacturing tolerances without sacrificing mirror flatness. Moreover, voltage-tilt angle uniformity and yield will improve across the wafer.

An object of the present invention is to overcome the shortcomings of the prior art by providing a MEMs device, which includes a hinge structure hidden beneath the mirror platform, thereby decoupling the hinge thickness and the mirror thickness enabling the mirror curvature and the hinge dimensions to be optimized, while maintaining a high fill factor.

SUMMARY OF THE INVENTION

Accordingly, the present invention relates to a micro-electro-mechanical (MEMs) device comprising:

a platform pivotable about first and second perpendicular axes above a substrate;

a pedestal extending upwardly from the substrate underneath the platform;

a first hinge extending from the pedestal enabling the platform to tilt about the first axis;

a gimbal frame extending at least partially around the first hinge for receiving an outer end of the first hinge; and a second hinge extending from the gimbal frame to an underside of the platform enabling the platform to roll about the second axis;

wherein the first and second hinges are disposed entirely underneath the platform to enable adjacent MEMs devices to be closely packed together.

Another aspect of the invention relates to a method of fabricating a micro-electro-mechanical device comprising the steps of:

a) providing a silicon-on-insulator (SOI) structure comprising first and second superposed wafer structures separated by a first etch stop layer, each of the first and second wafer structures comprising a handle substrate, a wafer layer, and a second etch stop layer therebetween, wherein the wafer layers of the first and second wafer structures are disposed on either side of the first etch stop layer;

b) removing the handle substrate and the second etch stop layer from the second wafer structure of the SOI structure;

c) etching a gimbal frame, and first and second hinge structures from the wafer layer of the second wafer structure, including removing most of the first etch stop layer thereunder and therearound;

d) providing a substrate layer including a pedestal extending therefrom;

e) attaching the first hinge structure to the pedestal; and f) removing the handle substrate and the second etch stop layer of the first wafer structure.

BRIEF DESCRIPTION OF THE DRAWINGS

The invention will be described in greater detail with reference to the accompanying drawings which represent preferred embodiments thereof, wherein:

FIG. 10b is a side view of the device of FIG. 10a;

FIGS. 11a to 11e are cross-sectional views illustrating the fabrication steps of the device of FIG. 3.

DETAILED DESCRIPTION

Figure 1:
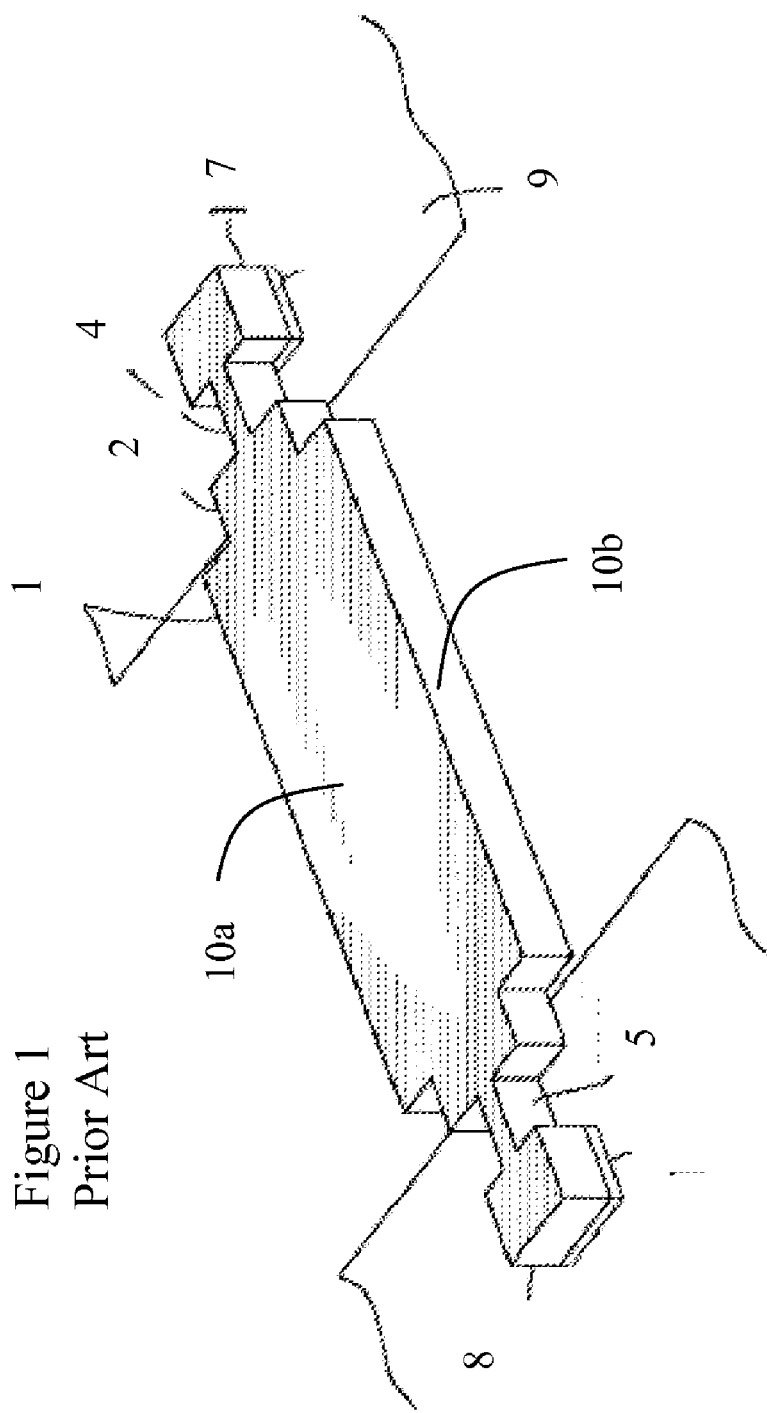
FIG. 1 is an isometric view of a conventional MEMs device.
Figure 2:
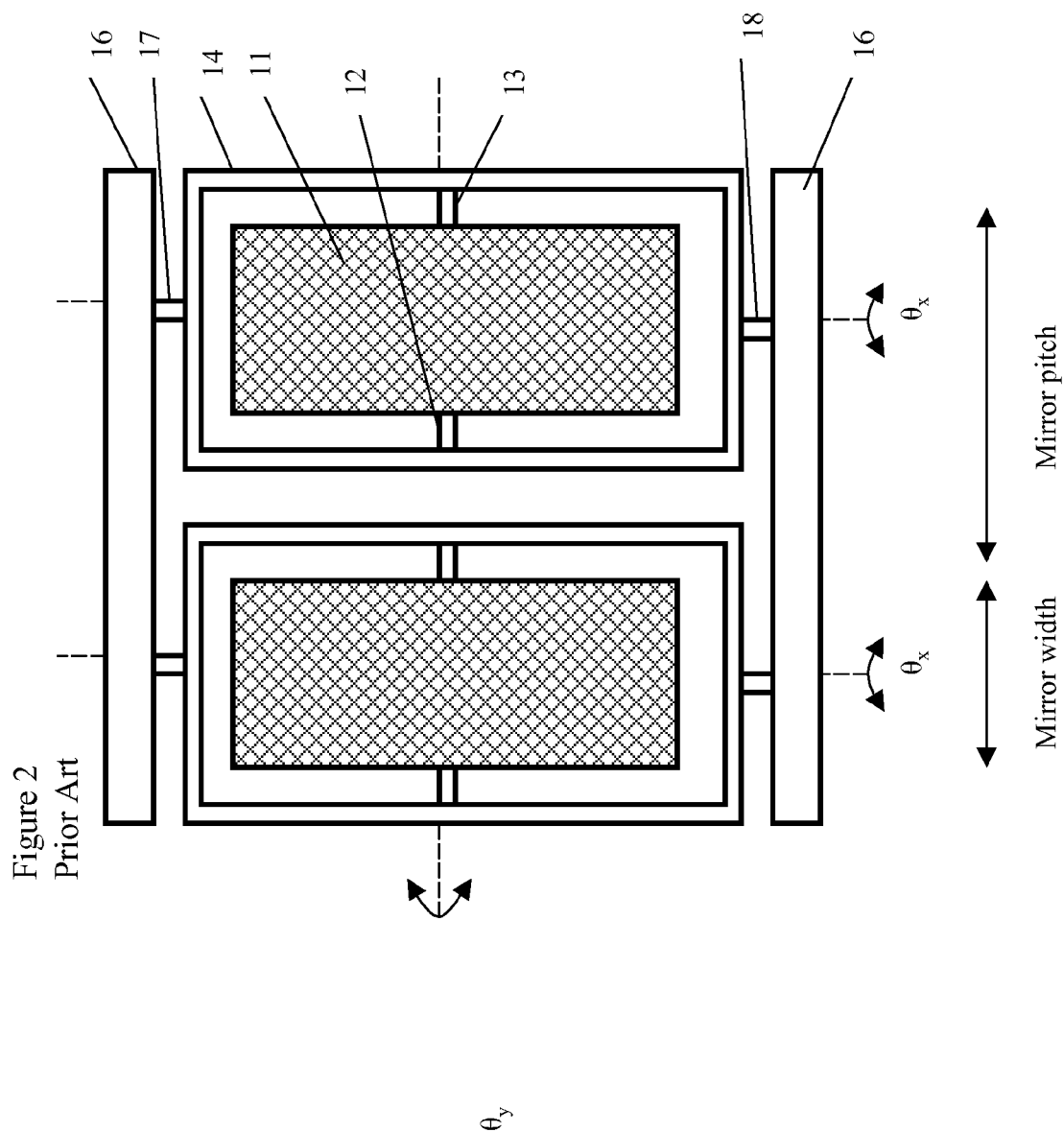
FIG. 2 is a plan view of a conventional external gimbal MEMs device.
Figure 3:
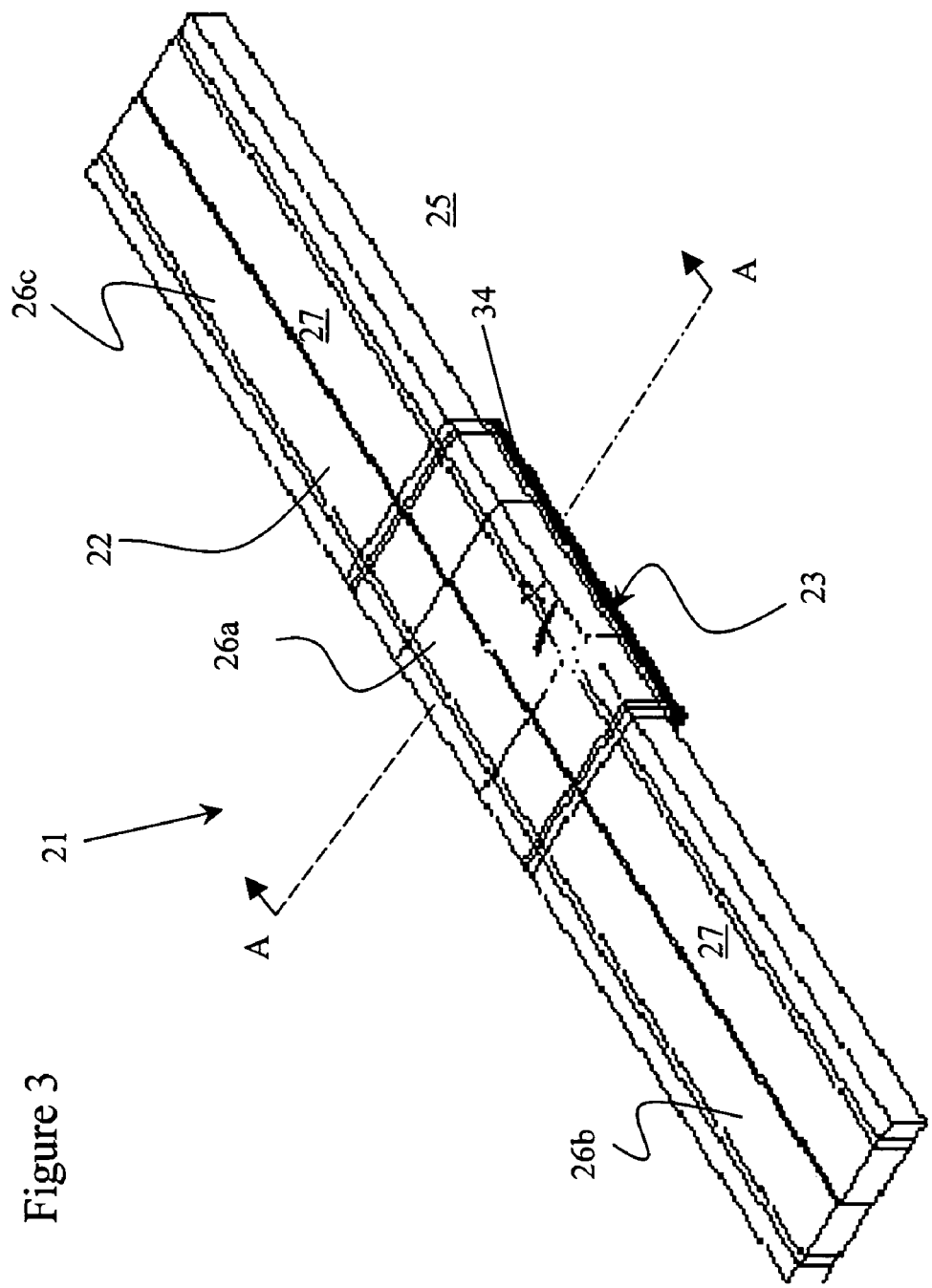
FIG. 3 is an isometric view of a pivoting MEMs device according to the present invention.
Figure 4:
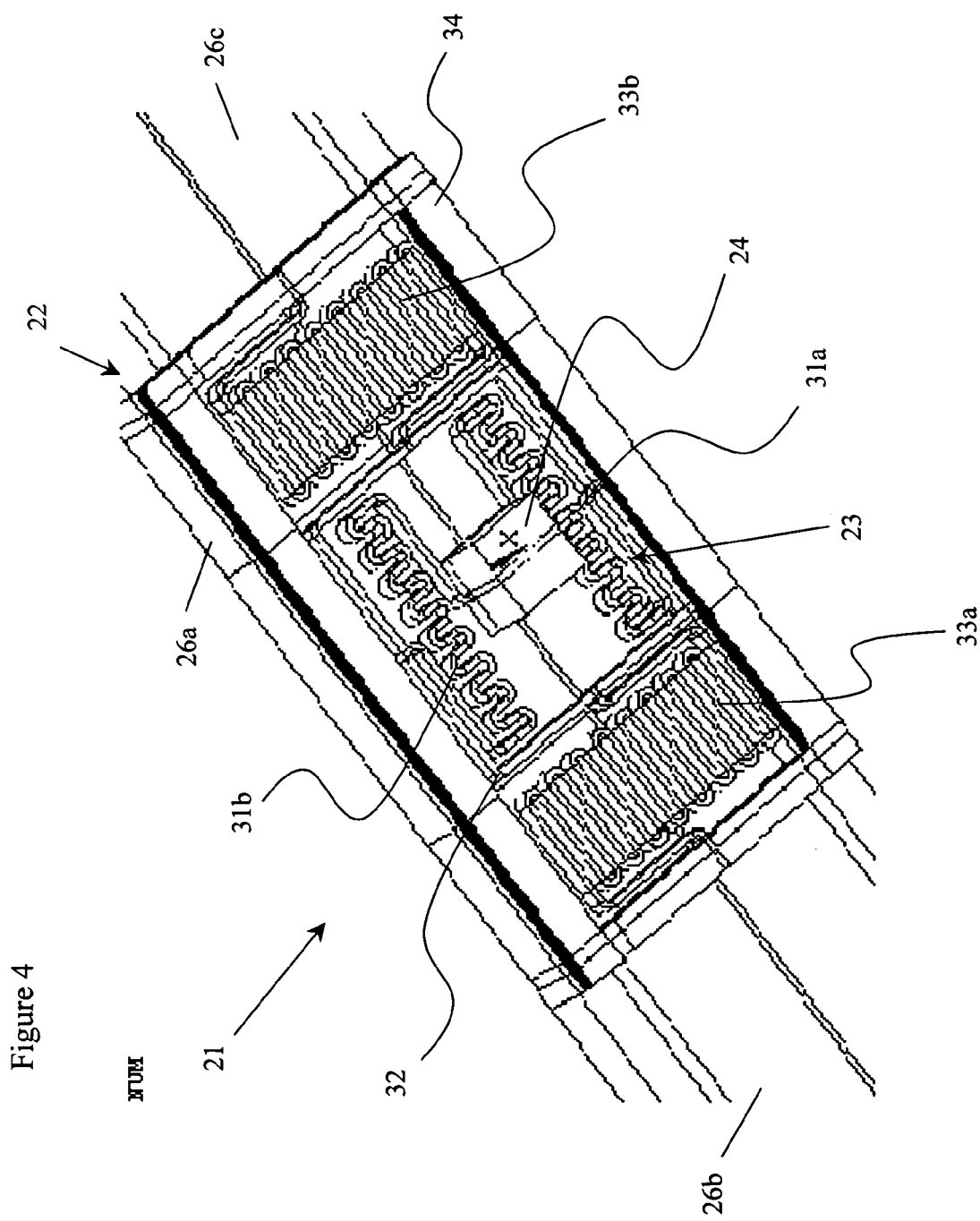
FIG. 4 is an isometric view of the device of FIG. 3 from below.
Figure 5:
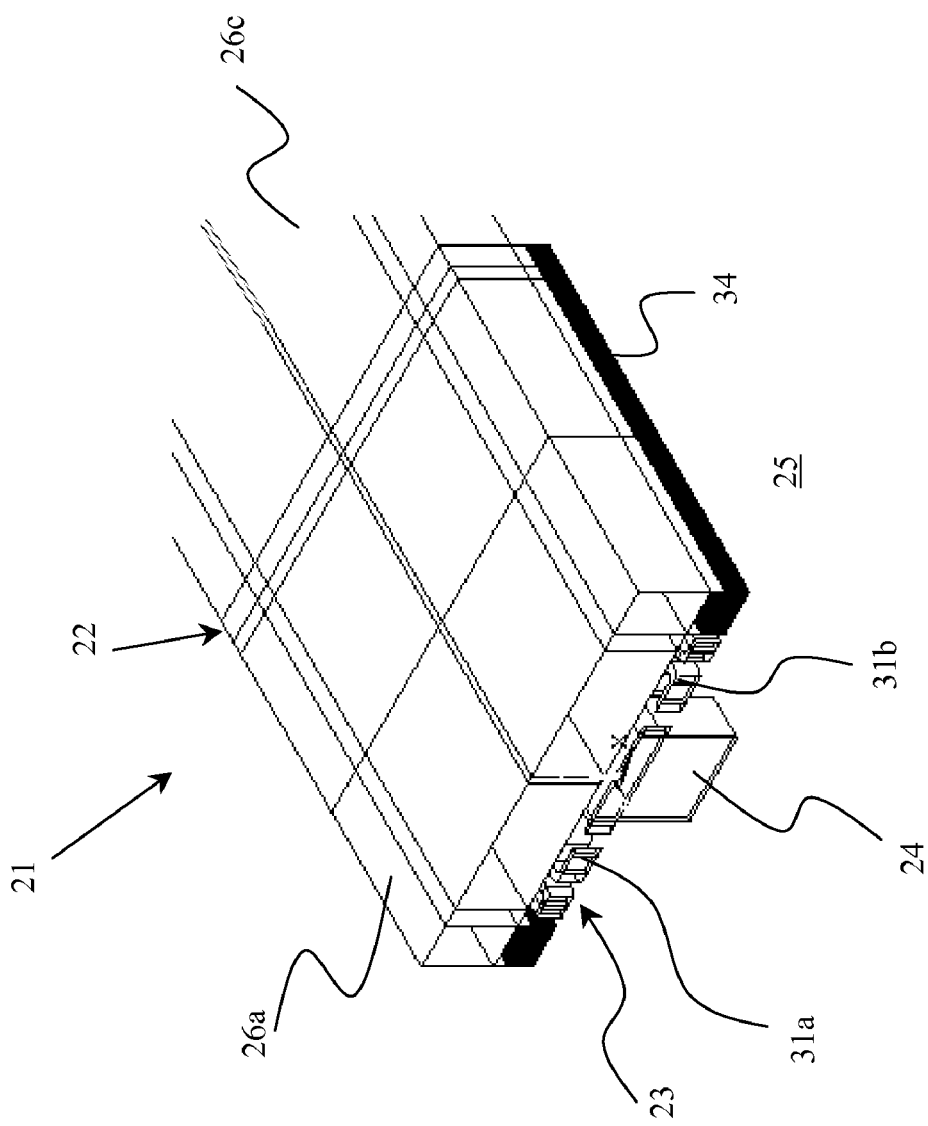
FIG. 5 is a cross-sectional view of the device of FIG. 3 along line A-A.

With reference to FIGS. 3, 4 and 5, a MEMs mirror device 21, according to the present invention, includes an upper platform 22 pivotable about two perpendicular axes, e.g. x and z, defined by a lower hinge structure 23 pivotally connected to a rectangular pedestal 24 extending from a substrate 25. Typically, the upper platform 22 has a middle section 26a, superposed above the hinge structure 23, and two outer planar sections 26b and 26c suspended above the substrate 25. A reflective coating 27, e.g. gold, can be disposed on any combination of the sections 26a, 26b and 26c of the upper platform 22 for redirecting an optical beam or optical sub-beams, as will be discussed hereafter with reference to FIGS. 11 to 13. The optical mirror is placed above the hinge structure 23 so that the length of the platform 22 can be reduced by one half of the length of the original Piano MEMS, i.e. 600 μm instead of 1200 μm (not including hinge area). Accordingly, the snap angle can be doubled and higher platform tilt angles can be achieved.

The lower hinge structure 23 includes a first torsional hinge, comprised of torsional beams 31a and 31b extending outwardly from opposite sides of the pedestal 24. Outer ends of the torsional beams 31a and 31b are connected to a gimbal frame, e.g. ring, 32 at least partially surrounding the first torsional hinge. The ends of the torsional beams 31a and 31b are connected to the pedestal 24 and the gimbal ring 32 along the x axis, i.e. a central lateral axis, enabling the upper platform 22 to tilt thereabout.

Preferably, the torsional beams 31a and 31b are serpentine torsional beams, which are considerably more robust than conventional torsional beam hinges. The serpentine hinge is effectively longer than a normal torsional hinge, which spans the same distance, thereby providing greater deflection and strength, without requiring the space that would be needed to extend a normal full-length torsional hinge. The illustrated torsional beams 31a and 31b include arms at each end thereof extending perpendicularly to the x axis, which are joined by a series of folds running parallel to the x-axis.

A second torsional hinge, formed by torsional beams 33a and 33b extend from opposite sides of the gimbal ring 32 into contact with an apron 34 extending downwardly from the upper platform 22. The ends of the torsional beams 33a and 33b are connected to the gimbal ring 32 and the apron 34 along the z axis, i.e. a central longitudinal axis, enabling the upper platform 22 to roll thereabout. The illustrated torsional beams 33a and 33b are serpentine torsional beams including arms at each end thereof extending perpendicularly to the z axis, which are joined by a series of folds running parallel to the z-axis.

Preferably, the gimbal ring 32 and the torsional beams 31a, 31b, 33a and 33b are fabricated from a single layer of material, and therefore have the same thicknesses and are adjacent one another beneath the pivoting platform 22.

Figure 6:
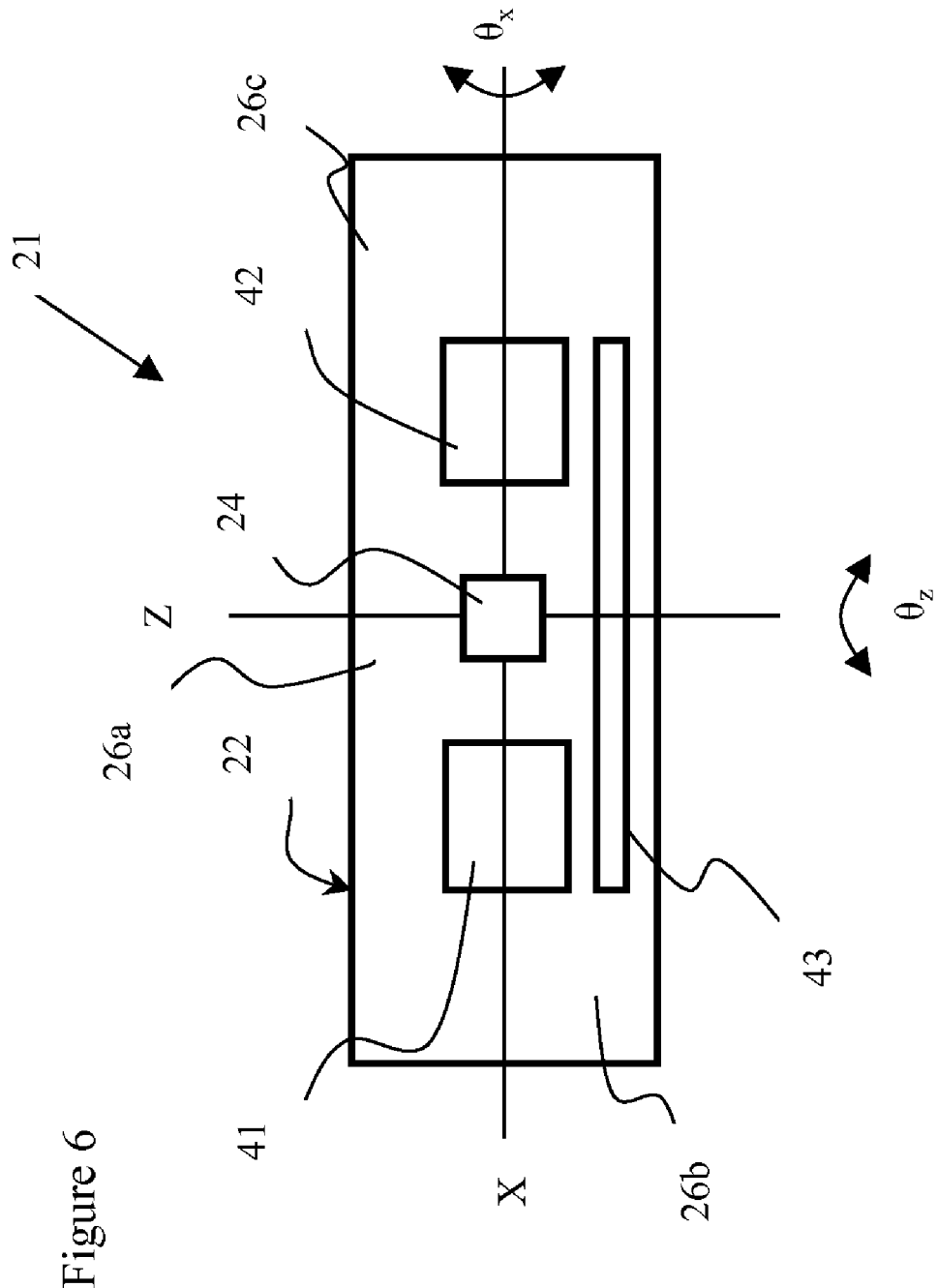
FIG. 6 is a schematic illustration of an electrode configuration for the device of FIG. 3.

To tilt the platform 22 about the first torsional hinge (Z-axis) one possible electrode configuration, illustrated in FIG. 6, includes a first $\theta_Z$ electrode 41 positioned under the first outer section 26b, and a second $\theta_Z$ electrode 42 positioned under the second outer section 26c on opposite sides of the pedestal 24. A single $\theta_X$ electrode 43 extends from adjacent the first $\theta_Z$ electrode 41 to adjacent the second $\theta_Z$ electrode 42 across the gap therebetween, and beneath one side of both of the first and second outer sections 26b and 26c. Actuation of the electrodes 41, 42 and 43 is controlled by an electrode control, which rolls the platform 22 about the X-axis as the platform 22 is tilted between various positions relative the Z-axis.

To prevent undesirable "ringing" of the platform 22, the voltage VzR of the first $\theta_Z$ electrode 41 is gradually decreased as the voltage Vx of the single $\theta_X$ electrode 43 is increased. As the voltage VzR decreases to zero, the voltage VzL of the second $\theta_Z$ electrode 42 gradually increases. As the voltage VzL reaches its set amount to maintain the platform 22 in the desired position, the voltage Vx is decreased to a minimum amount, assuming no compensation voltages are required. Alternative three and four electrode configurations are possible, including those disclosed in U.S. Pat. Nos. 6,968,101 and 7,010,188, which are incorporated herein by reference.

In the disclosed open loop configuration, the angular position of the platforms 22 depend non-linearly on the voltage applied by the electrodes 41 (or 42), i.e. as the applied voltage is increased linearly, the incremental change in angular platform position is greater as the voltage increases. Accordingly, there is a maximum voltage, i.e. an angular platform position, at which the platform angular position becomes unstable and will uncontrollably tilt until hitting part of the lower structure, e.g. the electrode 41. This maximum voltage sets the range of angular motion that the platform 22 can travel. The instability in the platform's angular position is a result of the distance between the platform 22 and the electrode 41 (the hot electrode) decreasing more rapidly at the outer free ends of the platform outer sections 26b and 26c than at the inner sections, nearer the pivot axis $\theta_Z$. As a result, the force per unit length along the platform 22 increases more rapidly at the outer free ends of the platform 22 than the inner sections. To increase the platform's range of angular motion, the field strength, i.e. the force per unit area, that is sensed at the outer free ends of the platform 22 must be reduced. With reference to FIGS. 7, 8, 9a, 9b, 10a and 10b, this is accomplished by providing the electrodes 41 and 42 with a two-step or slanted configuration.

Figure 7:
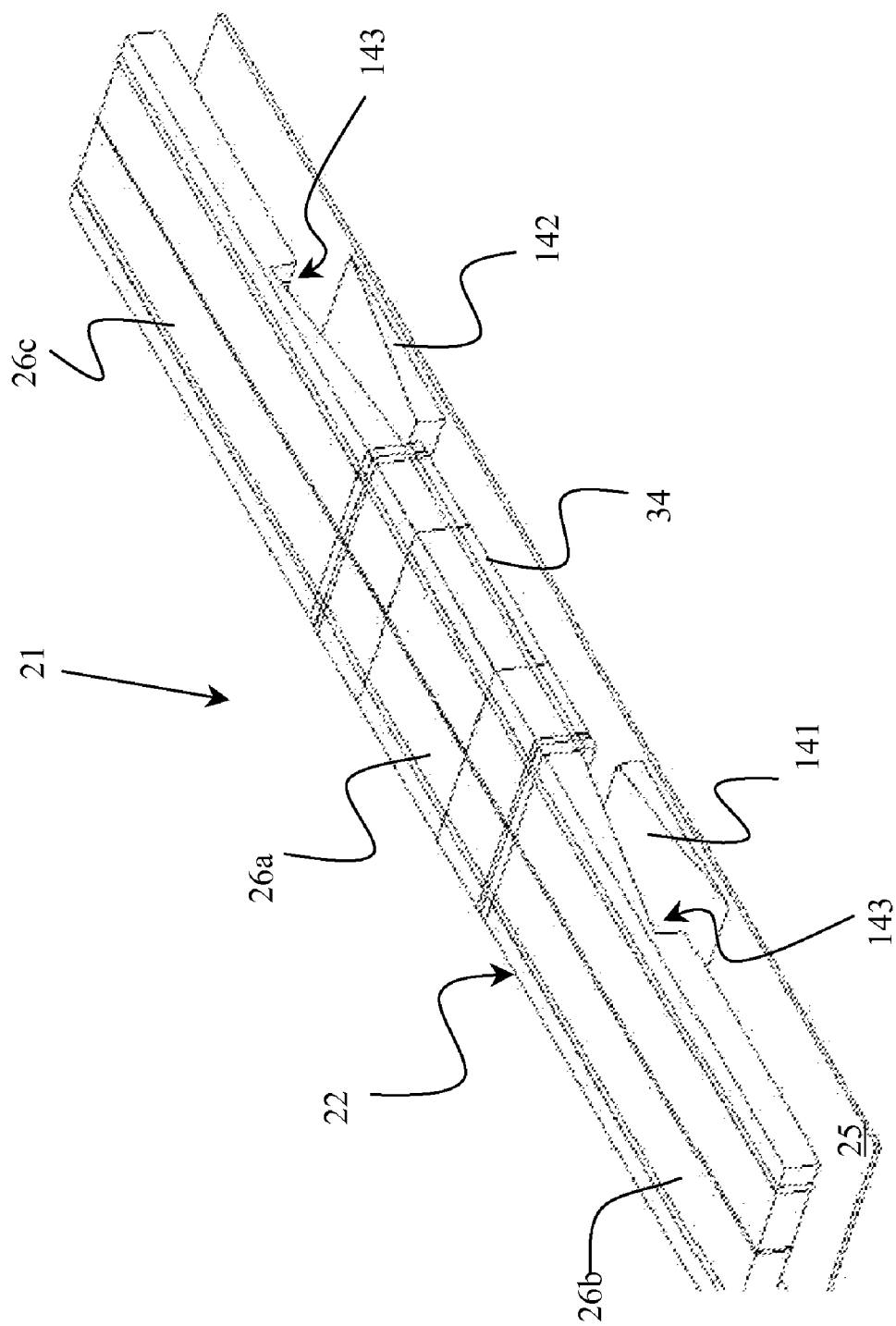
FIG. 7 is an isometric view of a pivoting MEMs device according to another embodiment of the present invention with a portion of the side cut away to reveal the slanted electrodes and platform undersurface.
Figure 8:
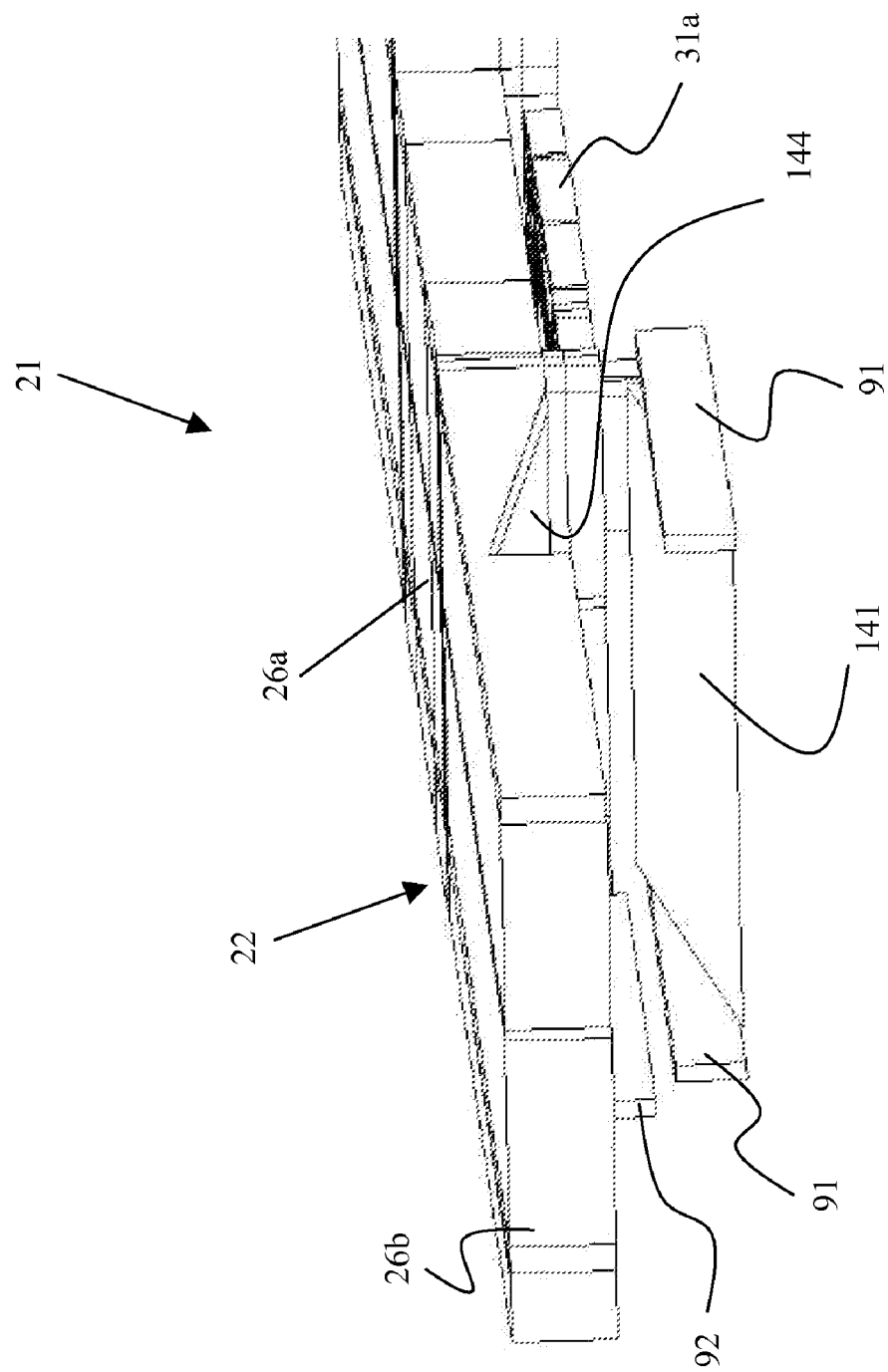
FIG. 8 is an isometric view of the device of FIG. 7 taken from the below.
Figure 9A:
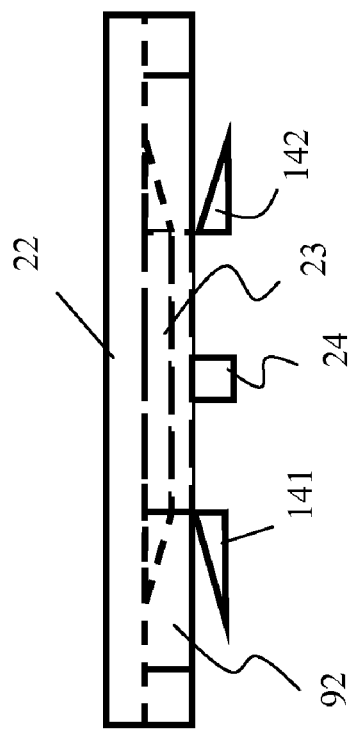
FIG. 9a is a cross-sectional view of the device of FIG. 7.
Figure 9B:
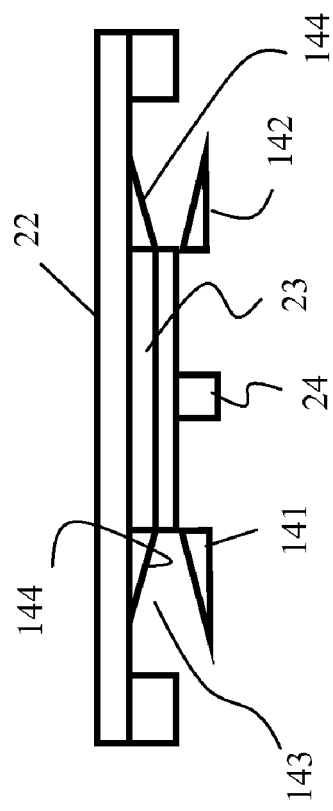
FIG. 9b is a side view of the device of FIG. 7.

With reference to FIGS. 7 and 8, the side of the platform 22 has been removed to reveal slanted electrodes 141 and 142, which are fabricated in the form of a ramp at an acute angle to the substrate 25. An upper or top end of the slanted electrodes 141 and 142 are positioned proximate the inner end of the platform 22, i.e. the Y axis, while a lower or bottom end are positioned under the outer free ends of the platform 22, thereby making the gap between the platform 22 and the electrodes 141 and 142 greater at the outer free end than at the inner end. To increase the effective distance between the bottom end of the electrodes 141 and 142, and the undersurface of the platform 22, a triangular section 143 (see FIGS. 9a and 9b) can be etched out of the undersurface of the platform 22 above the electrodes 141 and 142 forming a slanted bottom wall 144, which is at an acute angle to the upper surface of the platform 22. The bottom end of the electrodes 141 and 142 are beneath the deepest part of the etched section 143, i.e. the top or high end of the electrodes 141 and 142 are proximate the shallow end of the etched section 143, thereby decreasing the force per unit length at the outer free ends of the platform 22. Accordingly, the platform 22 is much more stable over a greater range of tilting positions. Alternatively, the underside of the platform 22 or the electrode 141 can be planar, while the other is slanted to provide a more limited reduction in the force per unit length of the platform 22.

Figure 10A:
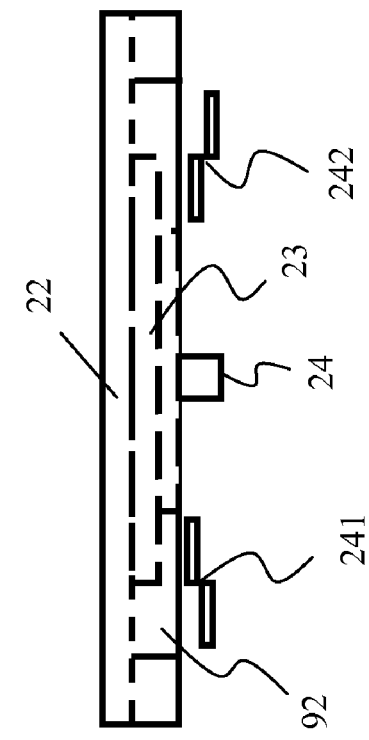
FIG. 10a is a cross-sectional view of a pivoting MEMS device according to another embodiment of the present invention with a stepped electrode and undersurface.
Figure 10B:
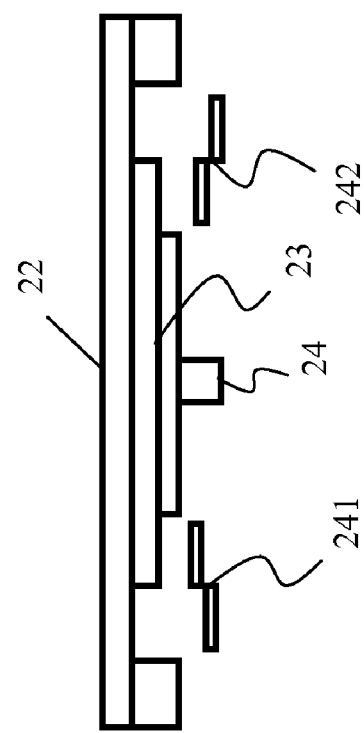

Alternatively, as illustrated in FIGS. 10a and 10b, first and second stepped $\theta_Z$ electrodes 241 and 242 can be disposed beneath the first and second outer sections 26b and 26c, respectively. Upper steps are positioned proximate middle section 26a of the platform 22, i.e. the Y axis, while lower steps are positioned under the outer sections 26b and 26c of the platform 22, thereby making the gap between the platform 22 and the electrodes 241 and 242 greater at the outer free end than the inner end. The area of the lower steps can also be made smaller, thereby reducing the force per unit area sensed by the outer free end of the platform 22. Multi-step electrodes, e.g. three or more can also provide a more even distribution of force. As above, to further increase the effective distance between the electrodes 241 and 242, and the platform 22, stepped rectangular sections 243 can be etched from the bottom surface of the platform 22. The deepest part of each section 243 is positioned above the lower (or outer) step of the electrodes 241 and 242, while the first step or shallowest part of section 243 is positioned over the upper step of the electrodes 241 and 242, thereby decreasing the force per unit length at the outer free ends of the platform 22. Accordingly, the platform 22 is much more stable over a greater range of tilting positions. Alternatively, the underside of the platform 22 or the electrode 241 can be planar, while the other is stepped to provide a more limited reduction in the force per unit length of the platform 22.

A consequence of closely packed micro-mirrors is that the actuation of a single mirror will impart a torque, i.e. an angular rotation, onto adjacent mirrors as a result of fringing electric fields. With reference to FIG. 8, in an effort to minimize this cross-talk, electrode grounding shields 91 are positioned on the substrate 25 around or on either side of the electrodes 141 and 142 forming electrode cavities, which are electrically isolated from each other. Preferably, the grounding shields 91 extend the length of the electrodes 141 and 142, as high as the top end of the electrodes 141 and 142, and completely or substantially underneath the platform 22 to enable adjacent platforms 22 to be closely packed. The grounding shields 91 are kept at ground potential, i.e. the same as the mirrored platforms 22, while one of the first and second electrodes 141 and 142 is held at an activation voltage, e.g. 100 Volts.

To further eliminate cross-talk between adjacent electrodes, additional platform shields 92 (FIGS. 8, 9b and 10b) can be added to the underside of the platform 22, outside or inside of the grounding shields 91. The platform grounding shields 92 can extend all the way around the platform 22, as in FIGS. 9b and 10b, or they can simply extend the length or slightly more than the length of the electrodes 141 and 142. Typically, in the rest position, the two different sets of shields 91 and 92 are substantially parallel, spaced apart and do not overlap; however, as the platform 22 tilts the platform shields 92 begin to overlap the grounding shielding 91. The added protection provided by overlapping shielding is particularly advantageous, when the tilt angle of the platform 26 is proportional to the voltage applied to the electrode 36 (or 37), such as in open loop configurations. Accordingly, the greater the tilt angle, the greater the required voltage, and the greater the amount of potential cross-talk, but consequently the greater the amount of shielding provided by the overlapping ground and platform shields 41 and 42, respectively.

The preferred fabrication process is based on defining the platform 22 and hinge 23 in a silicon-on-insulator (SOI) or other suitable material, e.g. semiconductor, wafer structure 61 including first and second superposed silicon or other suitable material wafer structures 62 and 63 separated by an etch stop layer, e.g. an oxide layer 64, see FIGS. 11a to 11e. The first silicon wafer structure 62 is comprised of a handle wafer 65, providing support during handling; a first SOI wafer layer 66, forming the upper platform 22; and a removable etch stop layer 67, e.g. a buried oxide layer (BOX) therebetween. The second silicon wafer structure 63 is comprised of a handle wafer 68, providing support during handling; a second SOI wafer layer 69, forming the hinge structure 23; and a removable etch stop layer 70, e.g. buried oxide layer (BOX), therebetween. Preferably, the removable etch stop layer 70 is thin enough, e.g. 2 to 3 nm, to enable electrical conductivity between layers 66 and 69 or is made of an electrically conductive material. Alternatively, the removable etch stop layer 70 can be made of a substantially non-conductive material with locally conductive sections, e.g. to ensure electrical conduction between platform 22 and cross-talk shields 92.

Figure 11D:
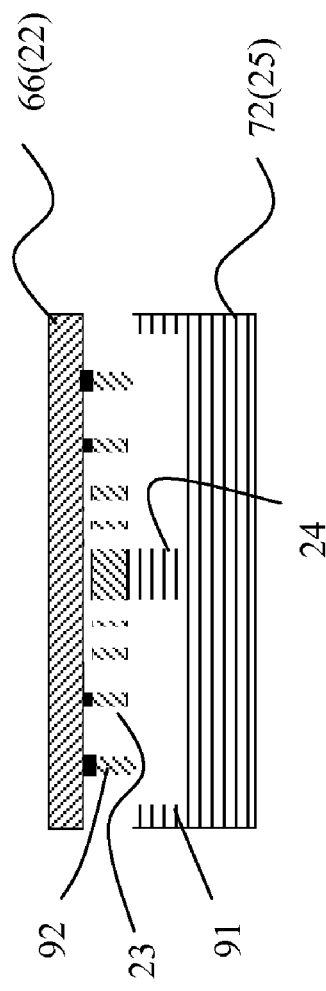
Figure 11E:
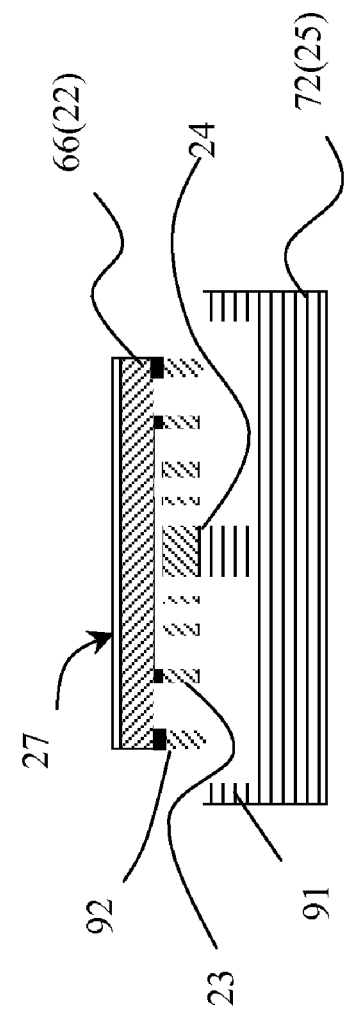

In the first step of the process, illustrated in FIG. 11a, the first and second silicon wafer structures 62 and 63 are bonded together with the BOX layer 64 therebetween. A cavity in the first SOI wafer layer 66 can be added above the position of the hinge structure 23 to ensure there is adequate spacing between the platform 22 and the hinge 23. To facilitate future etching steps, the second silicon wafer layer 69 may be patterned prior to bonding. In the second step, illustrated in FIG. 11b, the handle wafer 68 and the BOX layer 70 are removed revealing the second SOI wafer layer 69. The BOX layer 64 acts as an etch stop of the second SOI wafer layer 69, i.e. the hinge layer, thereby improving wafer uniformity. In step three, see FIG. 11c, the second SOI wafer layer 69 is patterned (if not already) in the shape of the hinge structure 23 (and stepped or slanted underside of platform 22, if necessary), and the excess material, including the BOX layer 64, is etched away leaving the hinge structure 23 and the cross-talk shields 92 (if necessary). Step 4 (FIG. 11d) involves bonding the remaining elements of the wafer 61 to a substrate or electrode wafer layer 72, which includes the pedestal 24 and cross-talk shields 91, if necessary, and removing the handle wafer layer 65 and the BOX layer 67 revealing the first SOI wafer layer 66, i.e. the platform 22. The electrode wafer layer 72 is formed with a timed etch or by using an oxide etch stop in the electrode wafer layer 72 forming the substrate 25. In the final step, FIG. 11e, the reflective coating 27, e.g. gold, is applied to the top of the platform 22, i.e. the first SOI wafer layer 66.

The double SOI process also enables mirror x-talk walls 92 to extend from the bottom surface of the platform 22, in the same layer as the hinge structure 23, thereby removing the need for electrode patterning over complicated topography in the lower electrode wafer 72. Dual-step electrode to mirror spacing can be achieved by combining an etched cavity in the electrode wafer 72, with an etched cavity 143 or 243 on the underside of the first SOI wafer 66, by selectively removing the hinge layer 69 from the underside of the first SOI wafer 66. Total cavity depth is therefore divided between the two wafers 66 and 69—avoiding dual etch steps, timed etch, & lithography over deep topography.

Figure 12:
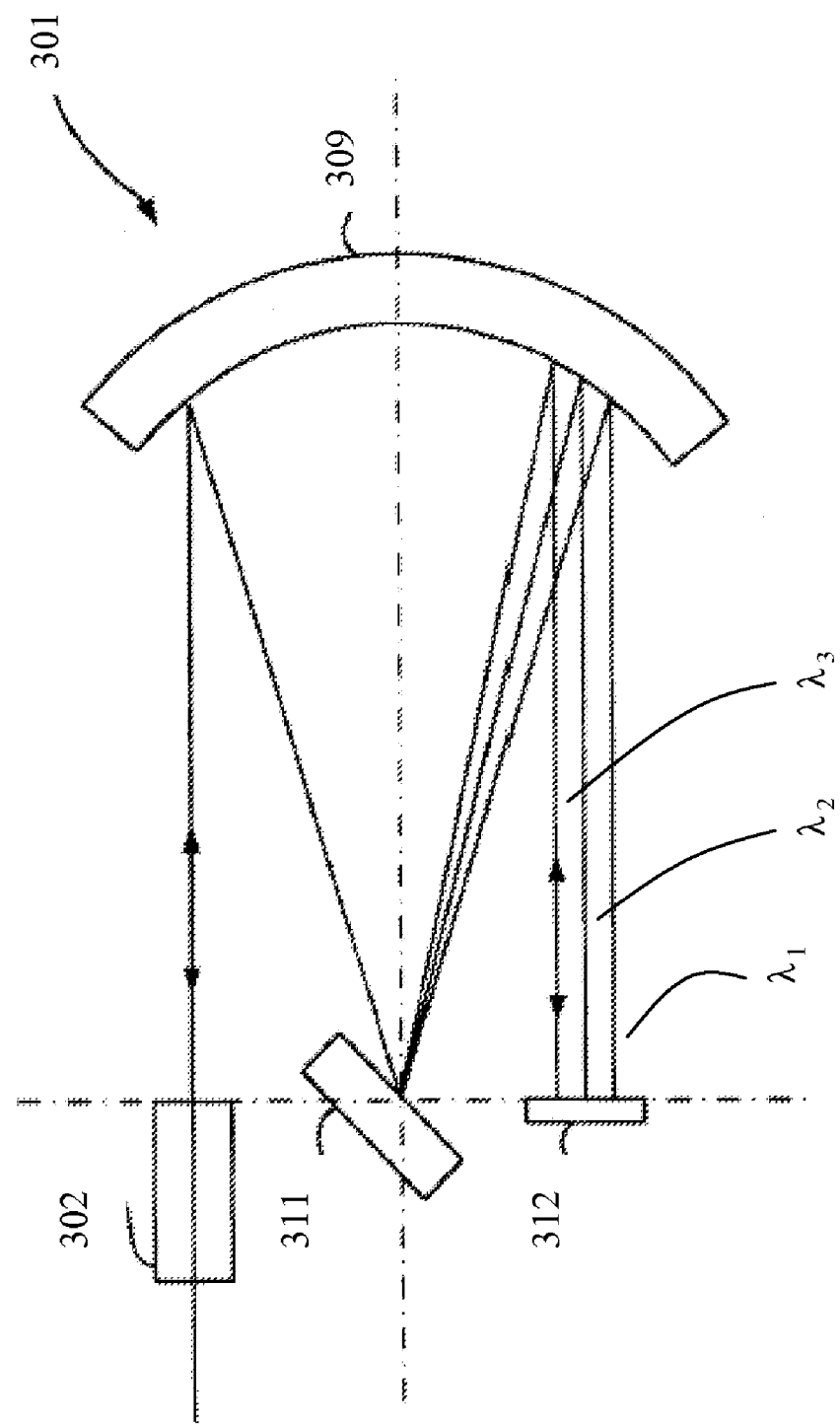
FIG. 12 is a schematic diagram of a wavelength switch utilizing the mirror devices of the present invention.
Figure 13:
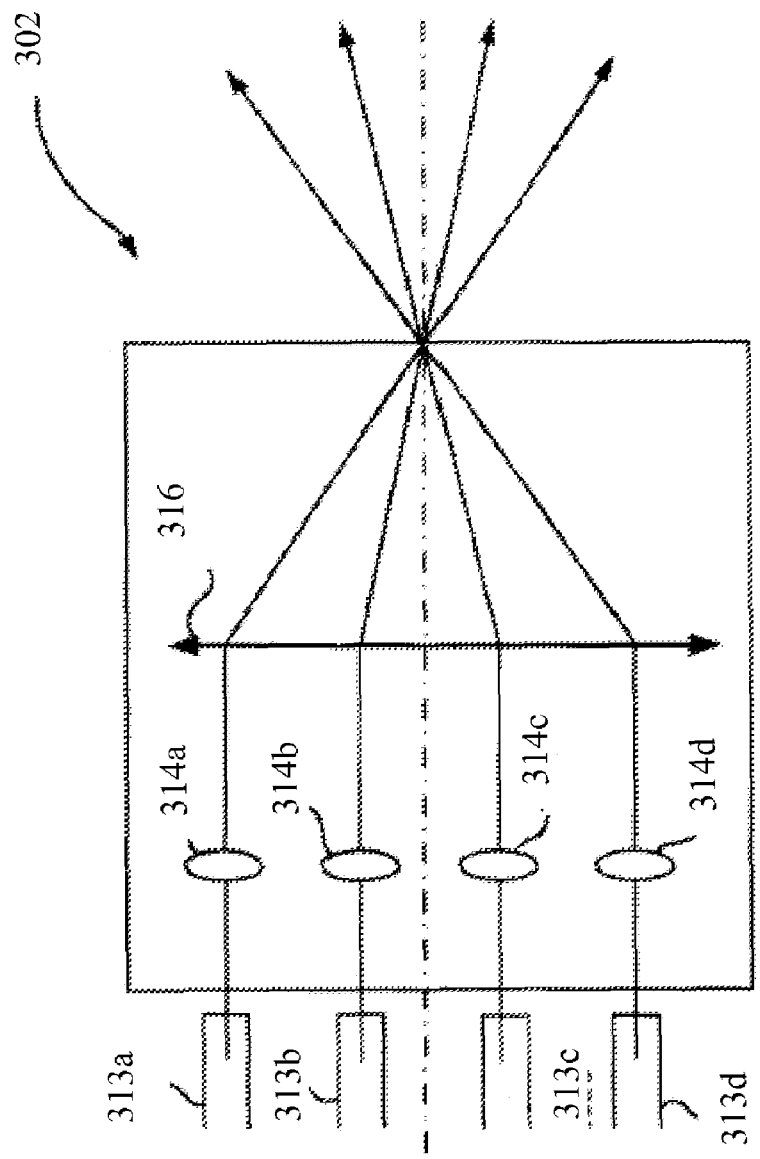
FIG. 13 is a schematic diagram of the input/output assembly for the wavelength switch of FIG. 12.
Figure 14:
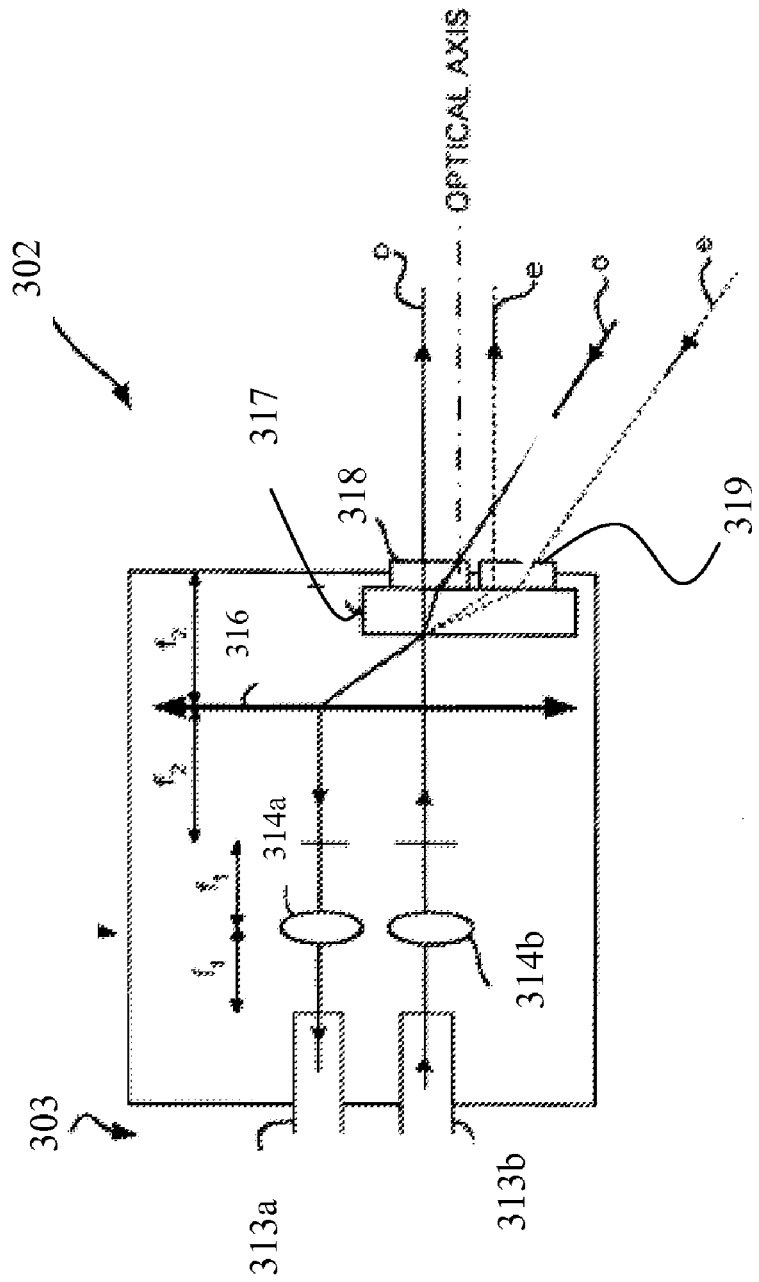
FIG. 14 is a schematic diagram of an alternative embodiment of an input assembly for the wavelength switch of FIG. 12.

The "piano" MEMs mirror devices according to the present invention are particularly useful in a wavelength switch 301 illustrated in FIGS. 12, 13 and 14. In operation, a beam of light with a plurality of different wavelength channels is launched via an input/output assembly 302, which comprises a plurality of input/output ports, e.g. first, second, third and fourth input/output ports 303, 304, 305 and 306, respectively. The beam is directed to an element having optical power, such as concave mirror 309, which redirects the beam to a dispersive element 311, e.g. a Bragg grating. The dispersive element separates the beam into the distinct wavelength channels ($\lambda_1$, $\lambda_2$, $\lambda_3$), which are again directed to an element having optical power, e.g. the concave mirror 309. The concave mirror 309 redirects the various wavelength channels to an array of "piano" MEMs mirror devices 312 according to the present invention, which are independently controlled to direct the various wavelength channels back to whichever input/output port is desired. Wavelength channels designated for the same port are reflected back off the concave mirror 309 to the dispersive element 311 for recombination and redirection off the concave mirror 309 to the desired input/output port. The concave mirror 309 can be replaced by a single lens with other elements of the switch on either side thereof or by a pair of lenses with the dispersive element 311 therebetween.

With particular reference to FIG. 13, the input/output assembly 302 includes a plurality of input/output fibers 313a to 313d with a corresponding collimating lens 314a to 314d. A single lens 316 is used to convert a spatial offset between the input/output ports into an angular offset. FIG. 14 illustrates a preferred embodiment of the input/output assembly, in which the unwanted effects of polarization diversity are eliminated by the use of a birefringent crystal 317 and a waveplate 318. For incoming beams, the lens 316 directs each beam through the birefringent crystal 317, which separates the beam into two orthogonally polarized sub-beams (o and e). The half waveplate 318 is positioned in the path of one of the sub-beams for rotating the polarization thereof by 90°, so that both of the sub-beams have the same polarization for transmission into the remainder of the switch. Alternatively, the waveplate 318 is a quarter waveplate and rotates one of the sub-beams by 45° in one direction, while another quarter waveplate 319 rotates the other sub-beam by 45° in the opposite direction, whereby both sub-beams have the same polarization. For outgoing light, the polarization of one (or both) of the similarly polarized sub-beams are rotated by the waveplate(s) 318 (and 319), so that the sub-beams become orthogonally polarized. The orthogonally polarized sub-beams are then recombined by the birefringent crystal 317 and output the appropriate input/output port. The micro-electro-mechanical devices according to the present invention are particularly well suited for use in switching devices with polarization diversity front ends, since they provide a pair of reflecting surfaces, i.e. one for each sub-beam.

We claim:

1. A micro-electro-mechanical (MEMs) device comprising:
   a platform pivotable about first and second perpendicular axes above a substrate;
   a pedestal extending upwardly from the substrate underneath the platform;
   a first hinge extending from the pedestal enabling the platform to tilt about the first axis;
   a gimbal frame extending at least partially around the first hinge for receiving an outer end of the first hinge; and
   a second hinge extending from the gimbal frame to an underside of the platform enabling the platform to roll about the second axis;
   wherein the first and second hinges are disposed entirely underneath the platform to enable adjacent MEMs devices to be closely packed together;
   wherein the first hinge comprises a pair of serpentine torsional beams extending from opposite sides of the pedestal along the first axis into contact with the gimbal frame; and
   wherein the second hinge comprises a pair of serpentine torsional beams extending from opposite sides of the gimbal frame along the second axis.

2. The device according to claim 1, wherein the gimbal frame and the first and second hinges have a same thickness and lie in a same plane, thereby enabling them to be fabricated from a same layer of material.

3. The device according to claim 1, further comprising:
   a first tilt electrode underneath the platform on one side of the first axis for tilting the platform about the first axis; and
   a roll electrode underneath the platform on one side of the second axis for rolling the platform about the second axis.

4. The device according to claim 3, further comprising a second tilt electrode underneath the platform on an opposite side of the first axis for tilting the platform about the first axis.

5. The device according to claim 3, wherein the first tilt electrode is slanted relative to a bottom surface of the platform.

6. The device according to claim 5, wherein a portion of the bottom surface of the platform above the first tilt electrode is slanted.

7. The device according to claim 3, wherein the first tilt electrode comprises a two step electrode.

8. The device according to claim 7, wherein a bottom portion of the platform above the first tilt electrode includes a two stepped cavity.

9. The device according to claim 3, further comprising cross-talk shields extending from the substrate on either side of the first tilt electrode for minimizing cross-talk between adjacent electrodes.

10. The device according to claim 9, wherein the cross-talk shields also extend from a bottom surface of the platform on either side of the first tilt electrode.

11. A method of fabricating a micro-electro-mechanical device comprising the steps of:
 a) providing a silicon-on-insulator (SOI) structure comprising first and second superposed wafer structures separated by a first etch stop layer, each of the first and second wafer structures comprising a handle substrate, a wafer layer, and a second etch stop layer therebetween, wherein the wafer layers of the first and second wafer structures are disposed on either side of the first etch stop layer;
 b) removing the handle substrate and the second etch stop layer from the second wafer structure of the SOI structure;
 c) etching a gimbal frame, and first and second hinge structures from the wafer layer of the second wafer structure, including removing most of the first etch stop layer thereunder and therearound;
 d) providing a substrate layer including a pedestal extending therefrom;
 e) attaching the first hinge structure to the pedestal; and
 f) removing the handle substrate and the second etch stop layer of the first wafer structure.

12. The method according to claim 11, wherein step a) includes providing a cavity in the first wafer layer above where the hinge structure is to be etched to ensure adequate spacing between the hinge and the first wafer layer.

13. The method according to claim 11, further comprising removing a triangular section from the first wafer layer, between steps c) and d), forming a slanted section therein.

14. The method according to claim 13, wherein in step d) the substrate layer also includes slanted electrode surfaces.

15. The method according to claim 11, further comprising removing rectangular sections from the first wafer layer, between steps c) and d), forming a stepped section therein.

16. The method according to claim 11, wherein step c) includes etching the first hinge a pair of serpentine torsional beams extending inwardly from the gimbal frame along a first axis; and etching the second hinge into a pair of serpentine torsional beams extending outwardly from opposite sides of the gimbal frame along a second axis.

17. The method according to claim 11, wherein step c) includes etching crosstalk shields from the wafer layer of the second wafer structure proximate outer edges of the wafer layer of the first wafer structure.

18. The method according to claim 11, wherein in step d) the substrate layer also includes cross-talk shields extending upwardly proximate outer edges thereof.

* * * * *